(12) United States Patent
Kuromatsu et al.

(10) Patent No.: US 8,051,821 B2
(45) Date of Patent: Nov. 8, 2011

(54) CAMSHAFT APPARATUS

(75) Inventors: Mikio Kuromatsu, Nara (JP); Hiroshi Ueno, Tondabayashi (JP)

(73) Assignee: JTEKT Corporation, Osaka-Shi, Osaka (JP)

( * ) Notice: Subject to any disclaimer, the term of this patent is extended or adjusted under 35 U.S.C. 154(b) by 378 days.

(21) Appl. No.: 12/318,839

(22) Filed: Jan. 9, 2009

(65) Prior Publication Data

US 2009/0178630 A1    Jul. 16, 2009

(30) Foreign Application Priority Data

Jan. 10, 2008   (JP) .................................. 2008-003542

(51) Int. Cl.
    *F01L 1/04*   (2006.01)
(52) U.S. Cl. .................. 123/90.6; 123/90.44; 29/888.1; 384/548
(58) Field of Classification Search .............. 123/90.44, 123/90.6; 29/888.1; 74/567; 384/548, 552
    See application file for complete search history.

(56) References Cited

U.S. PATENT DOCUMENTS

| | | | |
|---|---|---|---|
| 5,209,194 A * | 5/1993 | Adachi et al. .............. | 123/90.17 |
| 5,218,883 A | 6/1993 | Swars | |
| 2008/0115620 A1 | 5/2008 | Ueno et al. | |
| 2008/0173128 A1 | 7/2008 | Vogel et al. | |

FOREIGN PATENT DOCUMENTS

| | | |
|---|---|---|
| DE | 43 07 562 A1 | 9/1994 |
| EP | 1840411 A2 * | 10/2007 |
| EP | 1 862 695 A1 | 12/2007 |
| FR | 2 889 568 A | 2/2007 |
| FR | 2 901 571 A | 11/2007 |
| JP | 03-275907 A | 12/1991 |
| JP | 03-275908 A | 12/1991 |
| JP | 04-012102 A | 1/1992 |
| JP | 2005-090696 | 4/2005 |
| JP | 2006-226183 | 8/2006 |

OTHER PUBLICATIONS

European Search Report dated May 14, 2009.

* cited by examiner

*Primary Examiner* — Ching Chang
(74) *Attorney, Agent, or Firm* — McGinn IP Law Group, PLLC (57) ABSTRACT

A camshaft apparatus includes rolling bearings which support a camshaft rotatably, whereby a reduction in torque when an engine is started or is running at low speeds, a reduction in vibration of the camshaft and an extension of the lives of the bearings can be realized. In the rolling bearings, one rolling bearing is made to constitute a main ball bearing which restrains an axial relative movement of the camshaft relative to a shaft case, and the other rolling bearings are made to constitute a plurality of needle roller bearings, whereby a mechanical movement of the camshaft in an axial direction can be restricted in an ensured fashion by the main ball bearing. As to relative displacements due to thermal expansion or contraction of the camshaft and/or the shaft case, an axial relative displacement can be absorbed by needle rollers relatively moving on inter-cam outer circumferential surface areas.

12 Claims, 5 Drawing Sheets

CAMSHAFT APPARATUS

BACKGROUND OF THE INVENTION

The present invention relates to a camshaft apparatus which is driven to rotate in synchronism with rotation of an engine, and more particularly to a camshaft apparatus which is supported rotatably by rolling bearings.

Figure 4:
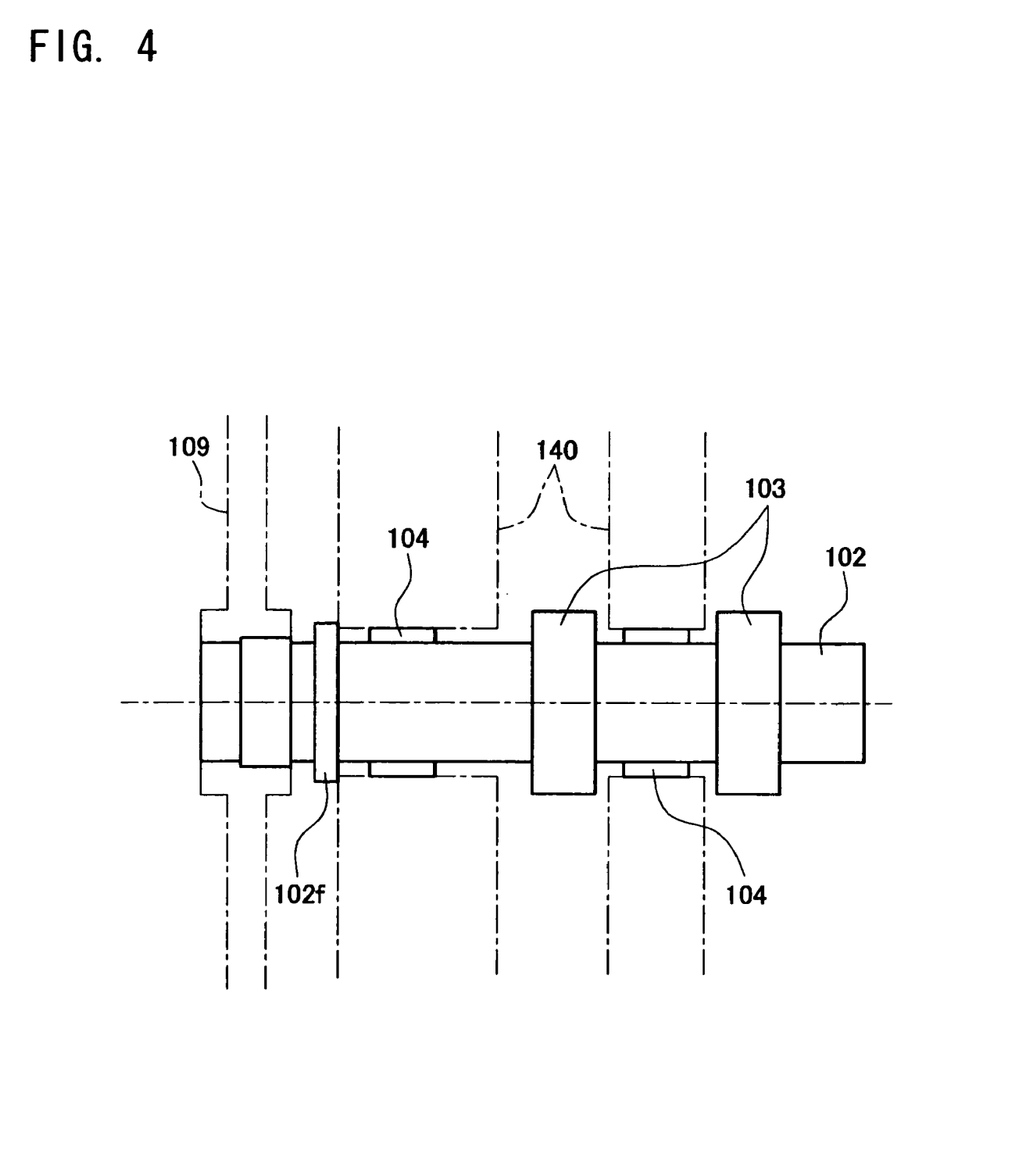
FIG. 4 is an explanatory view of a conventional camshaft apparatus which adopts a slide bearing.
Figure 5:
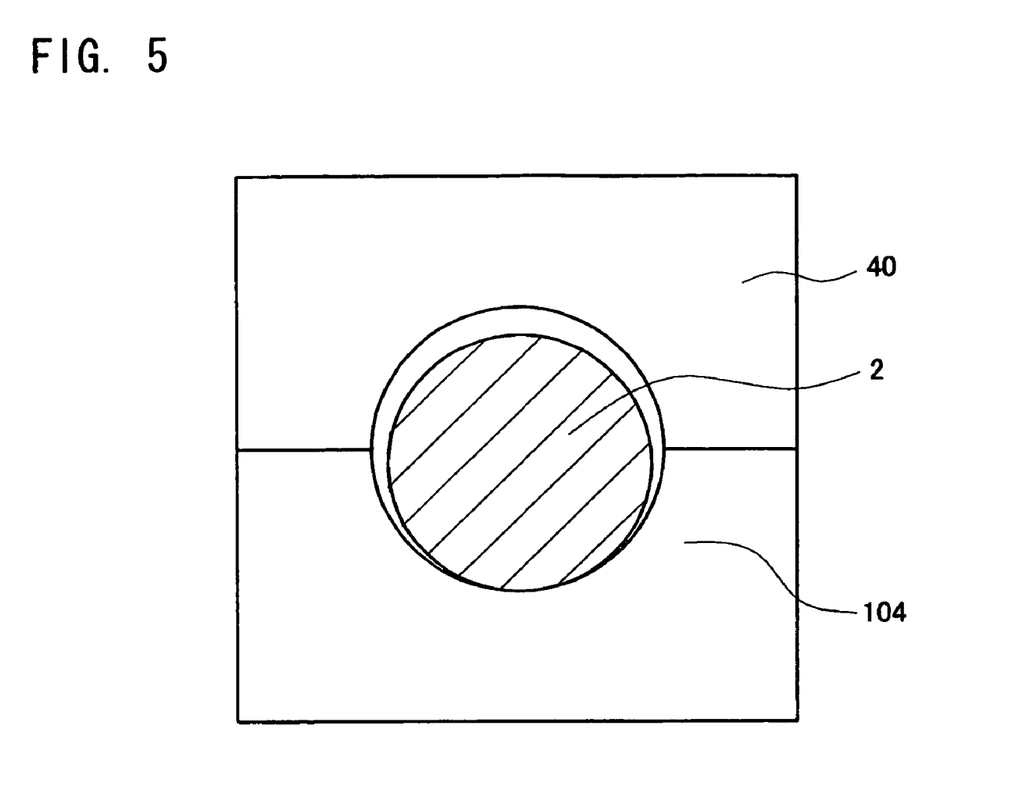
FIG. 5 is a view explaining a problem inherent in the slide bearing.

Generally, as an example of a bearing construction for supporting a camshaft rotatably in a shaft case, there has been known a slide bearing construction in which an outer circumferential surface of a camshaft 102 is supported directly by slide bearings 104 of a shaft case 140 as shown in FIG. 4. In this case, however, since the outer circumferential surface of the camshaft 102 is brought into direct contact with the bearing portions 104, there is caused a problem of short life or generation of vibration. In addition, as is shown in FIG. 5, in the slide bearing 104, when the camshaft 102 stops rotating, the camshaft 102 falls to rest on the bearing side and is then brought into line contact with the slide bearing 104 to thereby increase friction therebetween. This then causes a problem that the increased friction will results in a remarkable torque increase when the engine is started or is running at low speeds. Further, since the slide bearing 104 permits the axial relative slide of the camshaft 102, a restriction flange 102f is formed at an end portion of the camshaft 102 which lies at an end to which a pulley 109 is attached in such a manner as to be brought into sliding contact with the shaft case 140, so as to restrict the axial movement of the camshaft 102. However, in this bearing construction, the sliding friction between the restriction flange 102f and the shaft case 140 becomes large, leading to a drawback that the torque loss becomes large.

With a view to avoiding the problems, JP-A-2006-226183 discloses a camshaft apparatus in which the slide bearings are replaced by deep groove ball bearings. By the adoption of the deep groove ball bearings, the rotational sliding friction of the camshaft is changed from sliding friction to rolling friction, thereby making it possible not only to reduce vibration but also to extend the life thereof. Further, even when the camshaft stops rotating, since the periphery of the camshaft is surrounded by balls, the camshaft does not fall, thereby making it possible to reduce the starting torque. Further, in the deep groove ball bearing, since the inner ring and the outer ring are fixedly fitted in the outer circumferential surface of the camshaft and the inner circumferential surface of the shaft case and the balls constituting rolling elements roll in such a state that the balls fit in the groove-shaped raceway surfaces of the inner ring and the outer ring, a function to restrict the axial movement of the camshaft 102 is provided. As a result, the pulley-side restriction flange which slide contacts the shaft case can be eliminated from the camshaft, this also contributing to reduction in rotational sliding friction of the camshaft.

In recent years, with a view to reducing the weight of an engine and its peripheral portions, a configuration has widely been adopted in which a shaft case is made of light metal such as an aluminum alloy. On the other hand, since the camshaft is a component used in a power transmission system, the camshaft is made of a steel material in order to ensure strength and durability. However, the periphery of the engine where the camshaft is disposed tends to be heated to high temperatures and is frequently subjected to thermal cycling occurring in association with start and stop of the engine. In this case, there exists a large difference in linear expansion coefficient between the shaft case to which the outer rings of the ball bearings are fixed and the steel material to which the inner rings of the ball bearings are fixed. Due to the portion where the camshaft is disposed being heated to high temperatures and subjected to thermal cycling, the axial relative displacement of the camshaft relative to the shaft case becomes large considerably. However, since the plurality of bearings which support the camshaft are made up of the ball bearings, the thermal relative displacement between the camshaft and the shaft case is retrained strongly. As a result, an undesirable strong preload is imparted to the ball bearings in the axial direction, whereby an increase in torque tends to be called for easily due to an increase in rotational sliding resistance, and an eccentric wear of the raceway surfaces tends to be produced easily.

SUMMARY OF THE INVENTION

An object to be achieved by the invention is to provide a camshaft apparatus which can reduce largely rotational torque of a camshaft, particularly, the rotational torque when an engine is started or is running at low speeds while restricting an axial movement of the camshaft and which is made difficult to be subjected to the influence of the difference in linear expansion coefficient between the camshaft and a shaft case.

With a view to achieve the object, according to an aspect of the invention, there is provided a camshaft apparatus comprising:

a shaft case;

a camshaft surrounded by the shaft case so as not to contact with the shaft case;

a pulley attached to the camshaft;

a plurality of cams which are aligned on an outer circumferential surface of the camshaft at predetermined intervals in an axial direction to define inter-cam outer circumferential surface areas on the outer circumferential surface between the adjacent cams;

a single main ball bearing which includes an inner ring fixed to the outer circumferential surface of the camshaft and having a groove-shaped raceway surface, an outer ring fixed to an inner circumferential surface of the shaft case and including a groove-shaped raceway surface, and balls which are disposed so as to fit in groove-shaped raceway surfaces of the inner and outer rings; and a plurality of roller bearings which are disposed in at least part of the inter-cam outer circumferential surface areas, wherein each of the roller bearings includes an outer ring fitted in the inner circumferential surface of the shaft case and having a raceway surface, and rollers disposed in such a manner as to be in contact with the raceway surface and the corresponding inter-cam outer circumferential surface area.

According to the camshaft apparatus of the aspect of the invention, since the bearings which support the camshaft rotatably are made up of the rolling bearings, a reduction in torque when the engine is running at low speeds, a reduction in vibration of the camshaft and an extension of in life of the bearings can be realized. In addition, even when the camshaft stops rotating, the camshaft does not fall, and hence, a reduction in starting torque can be reduced. Additionally, one of those rolling bearings is made to constitute the main ball bearing for restraining the axial relative movement of the camshaft relative to the shaft case, and the remaining rolling bearings are made to constitute the plurality of roller bearings. By this configuration, the mechanical movement of the camshaft in the axial direction can be restricted in an ensured fashion by the main ball bearing, and the relative displacement between the camshaft and the shaft case due to the thermal extension or contraction thereof can be absorbed by the relative slide movement of the rollers on the inter-cam outer circumferential surface areas, whereby the camshaft apparatus is made difficult to be influenced by the relative displacement between the camshaft and the shaft case due to the thermal extension or contraction thereof.

In particular, in the event that the camshaft is made up of a material having a different linear expansion coefficient from that of the shaft case (in the event that the former is made of a steel material and the latter is made of a light metal material such as aluminum or an aluminum alloy), the axial relative movement of the camshaft relative to the shaft case due to the difference in linear expansion coefficient between the camshaft and the shaft case tends to become large easily. However, by adopting the configuration of the invention, the aforesaid relative displacement can effectively be absorbed by the relative sliding movement of the rollers on the inter-cam outer circumferential surface areas. This enables the avoidance of impartation of an undesirable axial preload to the bearings due to the thermal factors, thereby making it possible to prevent an increase in torque due to an increase in rotational sliding resistance and generation of a drawback such as an eccentric wear of the raceway surfaces.

The main ball bearing is such as to form an axial displacement restraining point relative to the camshaft. In the camshaft, a displacement amount in association with thermal expansion or contraction becomes larger as a portion lies farther away from the displacement restraining point in the axial direction, and the displacement amount is made to be absorbed by the sliding displacement within the roller bearings. An outer circumferential edge portion of the outer ring of the main ball bearing is fixed in such a manner as to fit in the circumferential annular groove formed on the inner circumferential surface of the shaft case, whereby the effect of restraining the axial displacement of the camshaft can be increased largely. In addition, the main ball bearing can be provided on the camshaft in the position lying between the pulley and the cam of the plurality of cams which is situated closest to the pulley. By this configuration, a belt tension the camshaft would otherwise receive from the pulley side can be received in an ensured fashion by the main ball bearing, and the mechanical displacement of the camshaft in the axial direction can be restricted in an ensured fashion that would occur should the belt tension be transmitted to the camshaft.

The roller bearing can absorb the relative displacement between the camshaft and the shaft case by axial gaps defined between the outer ring thereof and the rollers. However, in the event that the rolling bearing is provided on the inter-cam outer circumferential surface in the position lying between the cams which define the inter-cam outer circumferential surface area and the outer ring thereof in such a manner as to produce axial displacement absorbing gaps, even though a relative displacement is produced which exceeds the axial gap amount of the rolling bearing itself, the relative displacement so produced can be absorbed without any problem.

The camshaft is made integral in the axial direction in such a manner as not to be divided while having a uniform outside diameter at axial sections where the plurality of cams are aligned, and the plurality of cams are made up of sintered members which are shrink fitted on the camshaft. By adopting this configuration, the shrink fitting of the cam on to the camshaft and the insertion of the camshaft into the roller bearing are performed alternately, the fabrication of the camshaft apparatus can be implemented without any problem, and outer rings which are formed in such a manner as not to be divided in a radial direction can be used for the outer rings of the roller bearings. By adopting this configuration, compared with the embodiment described in JP-A-2005-90696 in which the roller bearings of divided type are used, the number of constituent components can be reduced remarkably and the fabrication steps can be simplified. In this case, the inner ring of the main ball bearing can be press fitted on the outer circumferential surface of the camshaft.

In the invention, although the roller bearings and the main ball bearing can be provided on all the plurality of inter-cam outer circumferential surfaces, by all the bearings being made up of the rolling bearings, the rotational sliding friction of the bearings can be reduced, as a result of which the load carrying capacity of the individual bearings is increased. As a result, even though a certain number of rolling bearings are thinned out, the load from the camshaft can be borne by the remaining roller bearings or roller bearings provided sufficiently. As this occurs, a configuration can be adopted in which the roller bearings are provided on only part of the plurality of inter-cam outer circumferential surface areas, and by adopting this configuration, the production costs can be decreased by decreasing the number of bearings and the overall weight of the camshaft apparatus can be reduced. As this occurs, there are provided the inter-cam outer circumferential surface areas where no bearing is provided. For example, by providing the roller bearings on every other inter-cam outer circumferential surface area in the plurality of inter-cam outer circumferential surface areas, the total number of roller bearings provided can be decreased substantially to a half a total number of roller bearings which results when they are provided on every inter-cam outer circumferential surface area (as this occurs, a configuration results in which the inter-cam outer circumferential surface area where no bearing is provided and the inter-cam outer circumferential surface area where the bearing is provided are arranged alternately).

In addition, an auxiliary ball bearing can be provided which includes an inner ring which is fixed to the outer circumferential surface of the camshaft, an outer ring which is provided in such a manner as to enable its axial relative sliding displacement relative to the inner circumferential surface of the shaft case and balls which are disposed in such a manner as to fit in groove-shaped raceway surfaces formed on both the inner ring and the outer ring. By providing the auxiliary ball bearing, the load carrying capacity of the camshaft can be increased. In addition, being different from the main ball bearing, the auxiliary ball bearing permits an axial relative sliding displacement of the outer ring relative to the inner circumferential surface of the shaft case, the effect of thermal expansion or contraction of the camshaft and/or the shaft case can be absorbed without any problem. In a case where the main ball bearing is provided on the camshaft in the position lying between the pulley and the cam of the plurality of cams which is situated closest to the pulley, the auxiliary ball bearing can be provided at an opposite end portion of the camshaft to the end portion lying at the end to which the pulley is attached. This can function to reduce the length of a cantilever portion of the auxiliary ball bearing which extends towards the opposite end to the end to which the pulley is attached, thereby making it possible to prevent the application of an excessive bending load to the camshaft.

DETAILED DESCRIPTION OF PREFERRED EMBODIMENTS

An embodiment of the invention will be described below with reference to the drawings.

Figure 1:
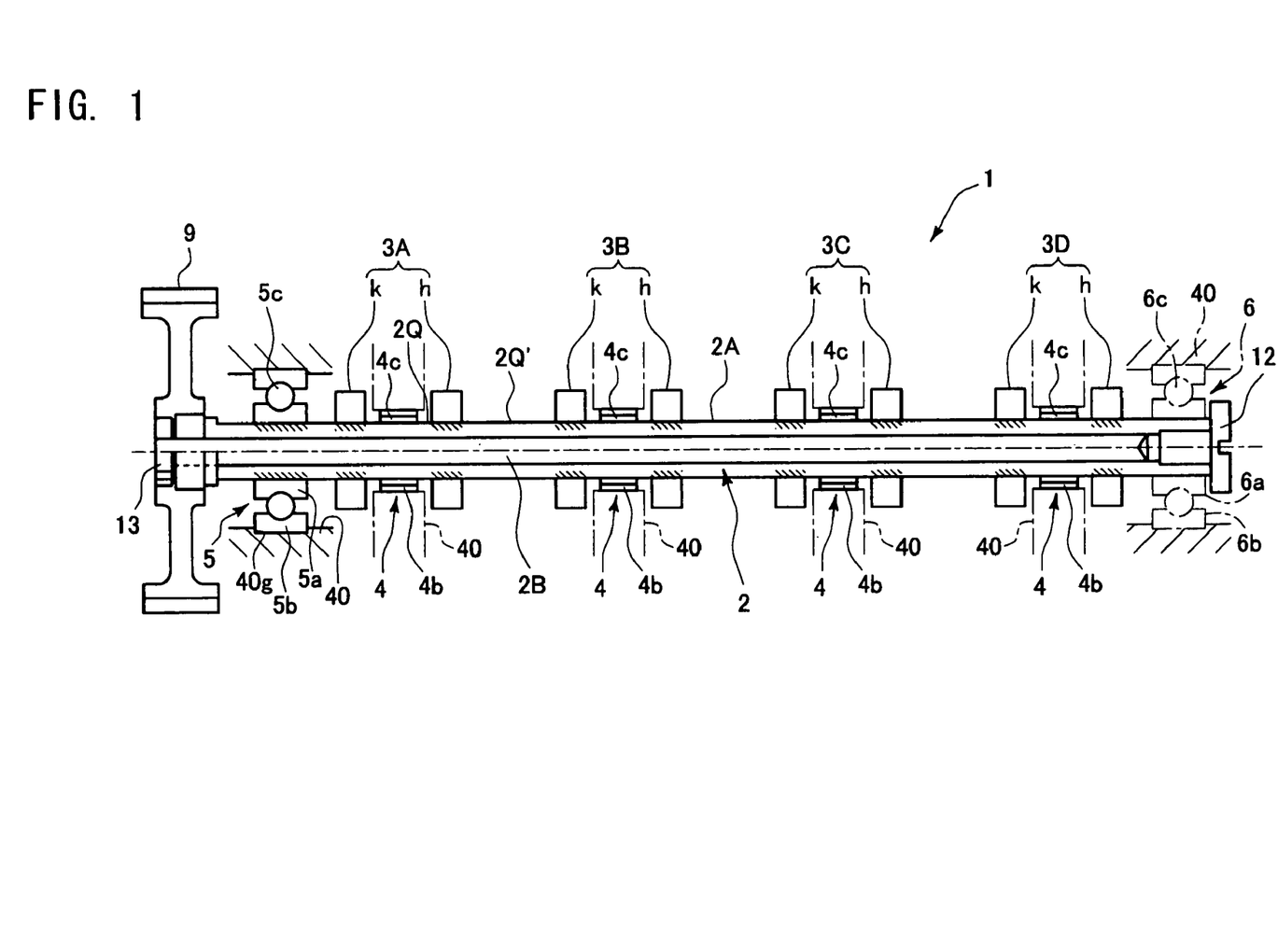
FIG. 1 is a side view of a camshaft apparatus according to an embodiment of the invention.

FIG. 1 is a side view of a camshaft apparatus 1 according to the embodiment of the invention. This camshaft apparatus 1 includes a camshaft 2 which is driven to rotate in synchronism with rotation of an engine, a plurality of pairs of cams 3A to 3D which are fitted on an outer circumference of the camshaft 2, and a plurality of rolling bearings 4, 5 which are provided on the outer circumference of the camshaft 2. In these components, the camshaft 2 is formed to have a single outside diameter throughout its length between opposite end portions thereof. The camshaft 2 is supported rotatably in an inner circumferential surface of (support portions of) a shaft case 40 by the plurality of rolling bearings 4, 5. A pulley 9 (in this embodiment, a timing pulley to which rotations of the engine are transmitted by a timing belt, and in the case of rotations of the engine being transmitted by a timing chain, a sprocket) is fastened and connected to an outer circumferential surface of one end (a left end in FIG. 1) of the camshaft with a bolt 13. In addition, the pulley 9 is connected to a crankshaft, which is an output shaft (whose illustration is omitted) via a timing belt (whose illustration is omitted), so as to rotate in synchronism with the crankshaft, whereby power of the engine is transmitted to the camshaft 2 via the pulley 9. The camshaft 2 is made up of an outer circumferential portion 2A and a core portion 2B, and an opening at the other end side (a right end in FIG. 1) of the outer circumferential portion 2A is sealed by a bolt 12. In addition, the camshaft apparatus 1 of this embodiment includes the pairs of cams 3A to 3D, each pair being made up of an inlet cam k and an exhaust cam h, and as is shown in FIG. 1, the pairs of cams are arranged to be located at predetermined intervals from the one end side to the other end side of the camshaft 2 so as to make up a group of cams.

An outer circumferential surface configuration of the end portion of the camshaft 2 to which the pulley 9 is attached is determined in such a manner as not to form any direct contact portion with the inner circumferential of the shaft case 40. Specifically, the restriction flange 102f which is provided at the end portion of the camshaft to which the pulley 109 is provided in the conventional configuration shown in FIG. 4 is eliminated, so as to produce the configuration in which the camshaft 2 is prevented from being brought into direct contact with the shaft case 40.

Figure 2:
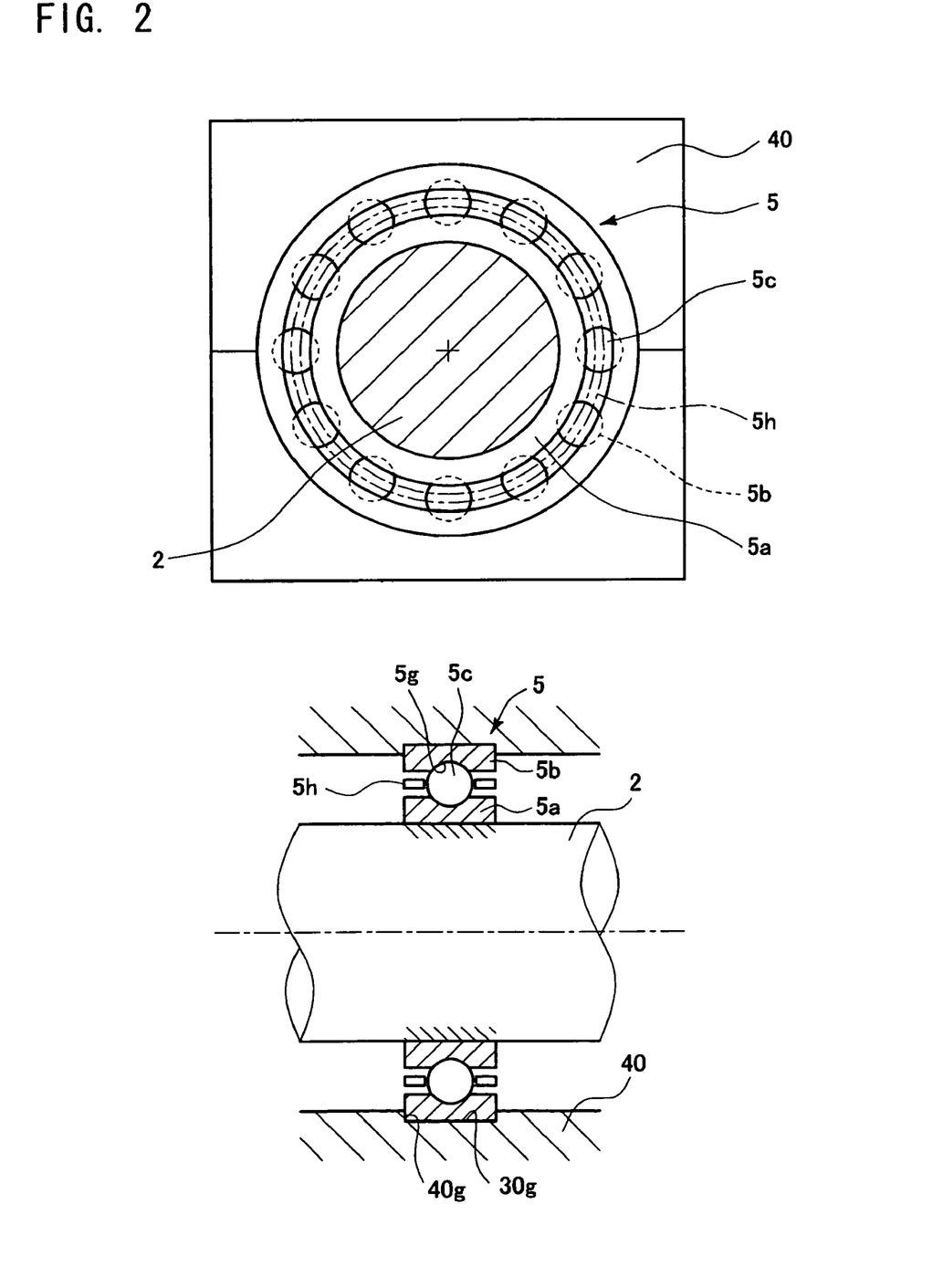
FIG. 2 is an enlarged explanatory view of a main ball bearing.
Figure 3:
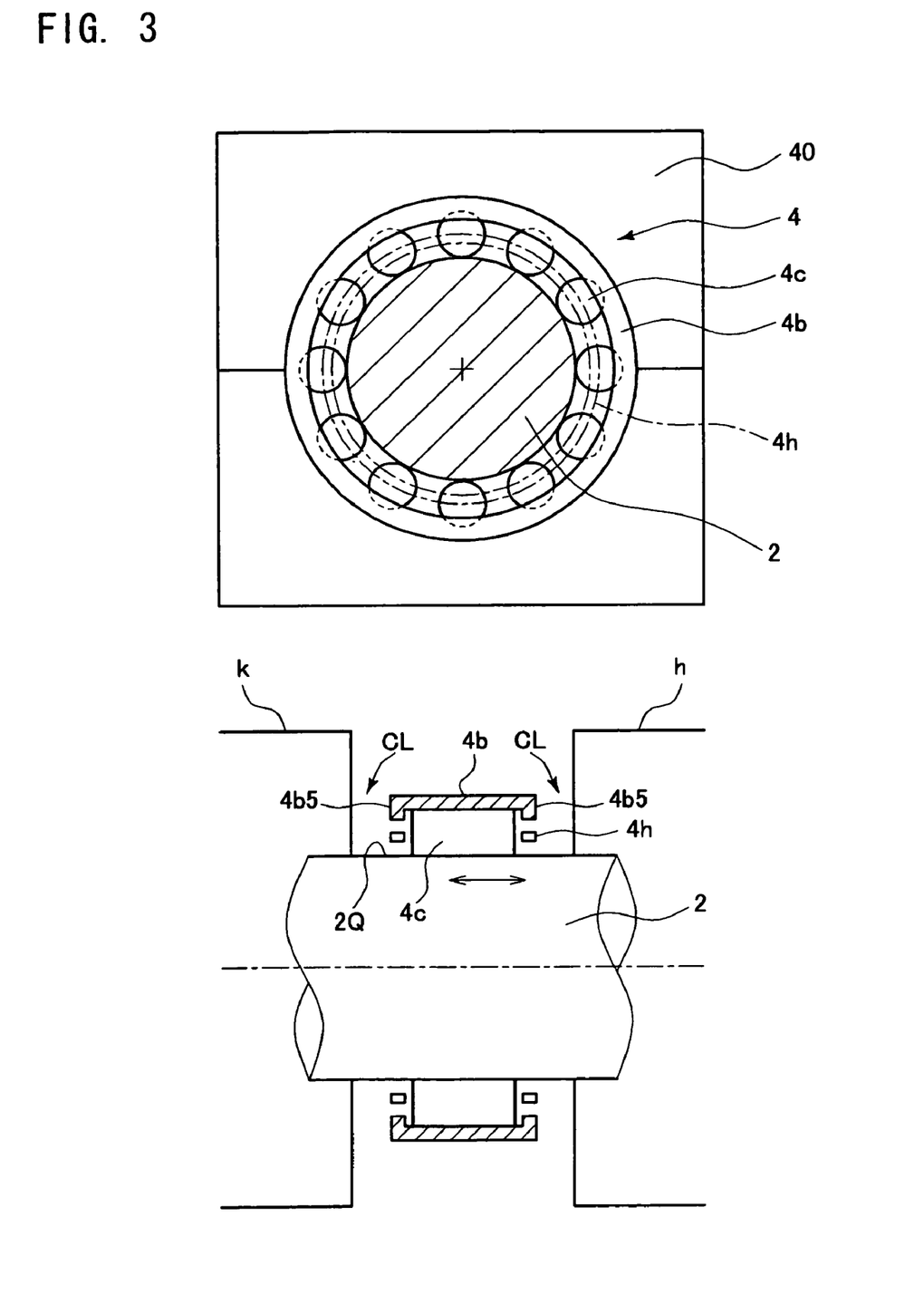
FIG. 3 is an enlarged explanatory view of a needle roller bearing.

The plurality of cams k, h are aligned at predetermined intervals in an axial direction on an outer circumferential surface of the camshaft 2. In addition, the bearings 4, 5 which support the camshaft 2 rotatably are made up of only rolling bearings. Specifically, the bearings 4, 5 are made up of a single main ball bearing 5 and a plurality of roller bearings 4. In addition, in the invention, any of needle rollers, rod rollers and cylindrical rollers which are specified to JIS: B1506 can be adopted as rollers of the roller bearings 4. In this embodiment, however, needle rollers are adopted (and hence, hereinafter, the roller bearings 4 will also be referred to as needle roller bearings 4 from time to time) As is shown in FIG. 2, the main ball bearing 5 is configured as a deep groove ball bearing and has an inner ring 5a which is fixed to the outer circumferential surface of the camshaft 2, an outer ring 5b which is fixed to the inner circumferential surface of the shaft case 40, balls 5c which are disposed in such a manner as to be fitted in groove-shaped raceway surfaces which are formed on both the inner ring 5a and the outer ring 5b and a cage 5h which regulates intervals at which the balls 5c are arranges in a circumferential direction. In addition, as is shown in FIG. 1, the needle roller bearings 4 are provided on some of a plurality of inter-cam outer circumferential surface areas 2Q which are formed by partitioning the outer circumferential surface of the camshaft 2 by the plurality of cams k, h. Each needle roller bearing 4 has, as is shown in FIG. 3, an outer ring 4b which is fitted in the inner circumferential surface of the shaft case 40, a raceway surface formed on an inner circumferential surface of the outer ring 4b, needle rollers 4c which are disposed in such a manner as to contact the corresponding inter-cam outer circumferential surface area 2Q of the camshaft 2, and a cage 4h which restricts intervals at which the needle rollers 4c are arranged in a circumferential direction. Specifically, the needle rollers 4c are provided on every other inter-cam outer circumferential surface area 2Q of the plurality of inter-cam outer circumferential surface areas 2Q. As a result, a configuration results in which the inter-cam outer circumferential surface areas 2Q' where no bearings are provided and the inter-cam outer circumferential surface areas 2Q where the bearings are provided are arranged alternately.

According to the camshaft apparatus of the invention that has been described above, since the bearings which support the camshaft 2 rotatably are made up of only the rolling bearings 5, 4, a reduction in torque when the engine is running at low speeds, a reduction in vibration of the camshaft 2 and an extension of the lives of the bearings can be realized. In addition, even though the camshaft 2 stops rotating, the camshaft 2 does not fall, and hence, a reduction in starting torque can be realized. Additionally, one of the rolling bearings is made to constitute the main ball bearing 5 which restrains an axial relative movement of the camshaft 2 relative to the shaft case 40, and the other rolling rollers are made to constitute the plurality of needle roller bearings 4. By adopting this configuration, the mechanical movement of the camshaft 2 in the axial direction can be restricted in an ensured fashion by the main ball bearing 5, while as to the relative displacement between the camshaft 2 and the shaft case 40 due to thermal expansion or contraction of the camshaft 2 and/or the shaft case 40, the axial relative displacement can be absorbed through relative sliding movement of the needle rollers 4c on the inter-cam outer circumferential surface areas 2Q. Thus, the needle roller bearings 4 are made difficult to be affected by the relative displacement between the camshaft 2 and the shaft case 40 that would otherwise appear remarkably. Further, since the restriction flange is eliminated to produce the configuration in which the camshaft 2 and the shaft case 40 are prevented from being brought into sliding contact with each other, no sliding friction is generated between the camshaft 2 and the shaft case 40, this also contributing to the suppression of increase in torque.

The camshaft 2 is made of a steel material such as a non-heat treated steel, while the shaft case 40 is made of an aluminum alloy. A linear expansion coefficient from the room temperature to a temperature of the order of 300° C. of the camshaft 2 is 12 to 13 ($\times 10^6$/K), while the same linear expansion coefficient of the shaft case 40 is 30 to 33 ($\times 10^{-6}$/K), the former showing a value which is larger by two to three times than the latter. Consequently, of the camshaft 2 and the shaft case 40 which are disposed on the periphery of the engine, when heated up, the shaft case 40 extends more than the camshaft 2. In other words, describing this phenomenon based on the shaft case 40 side, it can be said that the camshaft 2 contracts relative to the shaft case 40. On the contrary, when cooled down, the shaft case 40 contracts more than the camshaft 2. Similarly, describing this phenomenon based on the shaft case 40 side, it can be said that the camshaft 2 extends relative to the shaft case 40. In either case, the axial relative displacement of the camshaft 2 relative to the shaft case 40 due to the difference in linear expansion coefficient therebetween tends to become larger with change in temperature.

Specifically, an outer circumferential edge portion of the outer ring 5b of the main ball bearing 5 is fixed in such a manner as to be fitted in a circumferentially annular groove 40g formed on the inner circumferential surface of the shaft case 40, whereby the effect of restraining the axial displacement of the camshaft 2 is increased largely. In addition, the main ball bearing 5 can be provided between the pulley 9 and the cam of the plurality of cams k, h which lies closest to the pulley 9. By adopting this configuration, a belt tension the camshaft 2 would otherwise receive from the pulley 9 side can be received in an ensured fashion by the main ball bearing 5, thereby making it possible to restrict the mechanical displacement of the camshaft 2 in the axial direction that would otherwise occur in association with application of the belt tension to the camshaft 2.

As has been described above, the main ball bearing 5 is such as to form a restraining point relative to the camshaft 2 which restrains the axial relative displacement thereof, and the camshaft 2 displaces relative to the shaft case 40 in such a manner as to contract towards the main ball bearing 5 when heated up, while the camshaft 2 displaces relative to the shaft case 40 in such a manner as to extend to move away from the main ball bearing 5 when cooled down. However, in FIG. 1, a main part (a part lying further rightwards than the main ball bearing 5) of the camshaft 2 is supported by the plurality of needle roller bearings 4, and even though the camshaft 2 extends or contracts in the axial direction relative to the shaft case 40 as has been described above, the aforesaid relative displacements can effectively be absorbed through relative sliding movement of the needle rollers 4c on the inter-cam outer circumferential surface areas 2Q. As a result, it becomes possible to prevent the occurrence of drawbacks such as an increase in torque due to an increase in rotational sliding resistance and an eccentric wear of the raceway surfaces.

As is shown in FIG. 3, on the needle roller bearing 4, circumferential roller restriction flanges 4bf, 4bf are formed at axial ends of the outer ring 4b in such a manner as to project radially inwards, and axial gaps of a certain amount (that is, an axial play of the roller) are formed respectively between the needle roller 4c and the roller restriction flanges 4bf, 4bf. The needle roller bearing 4 can absorb the relative displace between the camshaft 2 and the shaft case 40 by the axial gaps so formed. However, in the embodiment, the needle roller bearing 4 is disposed on the inter-cam outer circumferential surface area 2Q in such a manner as to produce axial displacement absorbing gaps CL relatively between the cams k, h which define the inter-cam outer circumferential surface area 2Q and the outer ring 4b. By adopting this configuration, even though a relative displacement occurs which is larger than the relative displacement which can be absorbed by the axial gap amount of the needle roller bearing 4, the relative displace so occurring is made to be absorbed by the axial displacement absorbing gaps CL without any problem.

On the camshaft 2, a portion which lies axially farther from the main ball bearing 5 which constitutes the displacement restraining point (that is, a portion which lies closer to the right end portion of the camshaft 2 as viewed in FIG. 1) tends to have a larger displacement amount associated with thermal expansion or contraction of the camshaft 2. The axial displacement absorbing gaps CL which are defined between the cams k, h and the outer ring 4b are set to such a magnitude that the relative displacement amount at the portion of the camshaft which corresponds to the needle roller bearing 4 lying farthest away from the main ball bearing 5 in FIG. 1 can be absorbed sufficiently.

Next, in FIG. 1, the camshaft 2 is made integral along the axial direction in such a manner as not to be divided while having a uniform outside diameter at axial sections at each of which the pair of cams k, h are aligned. In addition, the plurality of cams k, h are made up of sintered members which are shrink fitted on the camshaft 2 (when shrink fitted, the sintered members which make up the cams k, h are heated so as to be expanded diametrically). By adopting this configuration, in the event that the shrink fitting of the cams k, h and the insertion of the camshaft 2 into the needle roller bearings 4 are performed alternately, the fabrication of the camshaft apparatus 1 can be implemented without any problem. Consequently, the outer ring 4b of the needle roller bearing 4 is formed in such a manner as not to be divided in a radial direction. On the other hand, the inner ring 5a of the main ball bearing 5 which is made of a steel material which has been subjected to quenching and tempering treatments is fitted on the outer circumferential surface of the camshaft 2 through cold or warm press fit.

In addition, as is shown by alternate long and short dash lines in FIG. 1, separately from the main ball bearing 5, an auxiliary ball bearing 6 can be provided which has an inner ring 6a which is fixed to the outer circumferential surface of the camshaft 2, an outer ring 6b which is provided in such a manner as to enable an axial relative sliding displacement relative to the inner circumferential surface of the shaft case 40, and balls which are disposed in such a manner as to be fitted in groove-shaped raceway surfaces which are formed both on the inner ring 6a and the outer ring 6b. By providing the auxiliary ball bearing 6, the load carrying capacity of the camshaft 2 can be increased. In addition, being different from the main ball bearing 5, since the auxiliary ball bearing 6 permits an axial relative sliding displacement of the outer ring 6b relative to the inner circumferential surface of the shaft case 40, the influences from thermal expansion or contraction of the camshaft 2 and/or the shaft case 40 can be absorbed without any problem. In FIG. 1, the auxiliary ball bearing 6 is also made as a deep groove ball bearing and is provided at an opposite end portion of the camshaft 2 to the end portion thereof to which the pulley 9 is attached. Thus, the length of a cantilever portion of the camshaft 2 is made small which extends further in an opposite direction to where the main ball bearing 5 is positioned than the auxiliary ball bearing 6. The outer ring 6b is fitted in the shaft case 40 through clearance fit or press fit in which a radial press fitting margin is made smaller than the outer ring 4b of the needle roller bearing 4.

What is claimed is:

1. A camshaft apparatus comprising:
    a shaft case;
    a camshaft surrounded by the shaft case so as not to contact with the shaft case;
    a pulley attached to the camshaft;
    a plurality of cams which are aligned on an outer circumferential surface of the camshaft at predetermined intervals in an axial direction to define inter-cam outer circumferential surface areas on the outer circumferential surface between the adjacent cams;
    a single main ball bearing which includes an inner ring fixed to the outer circumferential surface of the camshaft and including a groove-shaped raceway surface, an outer ring fixed to an inner circumferential surface of the shaft case and including a groove-shaped raceway surface, and balls which are disposed so as to fit in groove-shaped raceway surfaces of the inner and outer rings; and a plurality of roller bearings which are disposed in at least part of the inter-cam outer circumferential surface areas, wherein each of the roller bearings includes an outer ring fitted in the inner circumferential surface of the shaft case and including a raceway surface, and rollers disposed so as to be in contact with the raceway surface and a corresponding inter-cam outer circumferential surface area, wherein the main ball bearing is provided on the camshaft in a position between the pulley and a cam of the plurality of cams which is situated closest to the pulley.

2. The camshaft apparatus according to claim 1, wherein the camshaft comprises a material having a different linear expansion coefficient from a material of the shaft case, and wherein an axial relative displacement of the camshaft relative to the shaft case due to a difference in the linear expansion coefficient between the camshaft and the shaft case is absorbed by a relative sliding movement of the rollers on the inter-cam outer circumferential surface areas.

3. The camshaft apparatus according to claim 1, wherein the camshaft is made integral in the axial direction so as not to be divided and has a uniform outside diameter at axial sections where the plurality of cams are aligned, wherein the plurality of cams are made of sintered members which are shrink fitted on the camshaft, and wherein the outer ring of the roller bearings is formed so as not to be divided in a radial direction.

4. The camshaft apparatus according to claim 1, wherein the roller bearings are provided on only part of the plurality of inter-cam outer circumferential surface areas.

5. The camshaft apparatus according to claim 1, further comprising an auxiliary ball bearing which includes an inner ring which is fixed to the outer circumferential surface of the camshaft and including a groove-shaped raceway, an outer ring which is provided so as to be allowed to axially slide relative to the inner circumferential surface of the shaft case and includes a groove-shaped raceway, and balls disposed so as to fit in the groove-shaped raceway surfaces of the inner ring and the outer ring of the auxiliary ball bearing.

6. The camshaft apparatus according to claim 1, wherein the camshaft is axially restrained relative to the shaft case at the main ball bearing and a remainder of the camshaft is axially movable relative to the shaft case.

7. The camshaft apparatus according to claim 1, wherein the plurality of roller bearings include axial gaps between portions of the outer ring and the rollers.

8. The camshaft apparatus according to claim 1. wherein the plurality of roller bearings are disposed on every other inter-cam outer circumferential surface area of the inter-cam outer circumferential surface areas.

9. The camshaft apparatus according to claim 1, wherein the outer ring of the main ball bearing is disposed in a circumferentially annular groove formed in a circumferential surface of the shaft case.

10. The camshaft apparatus according to claim 1, wherein roller restriction flanges are formed at axial ends of the outer ring of the plurality of roller bearings, the roller restriction flanges projecting axially inwards from the outer ring, and wherein gaps are formed between the roller restriction flanges and the rollers.

11. The camshaft apparatus according to claim 1, wherein the rollers comprise needle rollers.

12. The camshaft apparatus according to claim 1, wherein the camshaft is axially fixed relative to the shaft case at the main ball bearing.

* * * * *